(12) United States Patent
Dummer

(10) Patent No.: US 6,224,071 B1
(45) Date of Patent: May 1, 2001

(54) THREE WHEELED CART FOR GAS CYLINDERS

(76) Inventor: James K. Dummer, 16614 Park Ave., Spanway, WA (US) 98387

( * ) Notice: Subject to any disclaimer, the term of this patent is extended or adjusted under 35 U.S.C. 154(b) by 0 days.

(21) Appl. No.: 09/241,470

(22) Filed: Feb. 1, 1999

(51) Int. Cl.[7] .................. B62B 3/10; B62B 3/12
(52) U.S. Cl. ............... 280/47.2; 280/47.27; 280/47.35
(58) Field of Search .................. 280/47.17, 47.19, 280/47.2, 47.24, 47.27, 47.315, 47.35, 79.3, 62, 79.5, 79.6, 79.7; 188/119, 16, 19; 414/444, 448, 449, 910; D34/18, 22

(56) References Cited

U.S. PATENT DOCUMENTS

| | | |
|---|---|---|
| D. 189,814 | 2/1961 | Smith ........................... D14/3 |
| 627,284 * | 6/1899 | Walker ........................ 280/47.2 |
| 2,381,858 * | 8/1945 | Austin ........................ 280/47.24 |
| 2,477,294 | 7/1949 | Fuller ............................ 214/66 |
| 2,598,168 * | 5/1952 | Hooz et al. .................. 280/47.2 |
| 2,685,351 | 8/1954 | Kramcsak, Jr. ............. 188/119 |
| 2,700,573 * | 1/1955 | Nordgard .................. 280/47.27 |
| 3,041,085 | 6/1962 | White ....................... 280/47.371 |
| 3,064,990 * | 11/1962 | Salvucci ...................... 280/47.2 |
| 3,081,108 * | 3/1963 | Vogt .......................... 280/47.19 |
| 3,258,275 * | 6/1966 | Schaefer et al. ........... 280/47.2 |
| 3,893,687 * | 7/1975 | Victor ....................... 280/47.27 |
| 4,258,831 * | 3/1981 | Weber ......................... 188/119 |
| 5,328,193 * | 7/1994 | Shiew .......................... 280/62 |
| 5,445,399 * | 8/1995 | Salvucci, Sr. ............. 280/47.27 |
| 5,479,840 * | 1/1996 | Hilliard et al. .............. 188/19 |
| 5,636,852 * | 6/1997 | Sistrunk et al. .......... 280/47.19 |
| 5,658,118 | 8/1997 | Luca .......................... 414/444 |
| 5,722,515 * | 3/1998 | Wyse ....................... 280/47.27 |

FOREIGN PATENT DOCUMENTS

| | | | |
|---|---|---|---|
| 857889 * | 12/1952 | (DE) | .......................... 280/62 |
| 965067 * | 2/1950 | (FR) | ........................ 280/47.2 |
| 2513957 * | 4/1983 | (FR) | ...................... 280/47.27 |
| 134324 * | 1/1952 | (SE) | ...................... 280/47.27 |

OTHER PUBLICATIONS

"Anthony Welded Products", Catalog A–100, pp. 12 and 19–21, 1990.*

* cited by examiner

*Primary Examiner*—Frank Vanaman
(74) *Attorney, Agent, or Firm*—John F. Bryan

(57) ABSTRACT

A three wheeled cart is equipped with an inclined gas cylinder holding rack, which is configured to accept a set of two such cylinders, and a towing drawbar, pivotally connected for vertical movement, is connected to the steerable front wheel. The cart is tipped up to reorient the cylinder holding rack vertically, in which position the drawbar length contacts the ground to act as a prop, supporting the cart in the reoriented attitude so as to facilitate the transfer of standing gas cylinders into the vertically positioned cylinder holding rack.

8 Claims, 2 Drawing Sheets

THREE WHEELED CART FOR GAS CYLINDERS

TECHNICAL FIELD

The present invention relates to the field of aircraft ground service equipment and more particularly, to apparatus for facilitating the handling of nitrogen cylinders as required for pressurizing aircraft tires, oleo struts, hydraulic accumulators and operating pneumatic aircraft jacks.

BACKGROUND OF THE INVENTIONS

In recent memory, the air transportation industry has grown to become the primary mover for priority freight, mail and people. This massive task, and the ever increasing cost of aircraft have combined to focus management attention on efficient aircraft usage and scheduling maintenance to maximize utilization. Thus, aircraft maintenance is done, insofar as possible, as ground service on the ramp during routine flight stops. Such measures characterize the cost management efforts needed to be competitive in the industry.

One aspect of these maintenance procedures is checking landing gear tire and strut pressures and hydraulic accumulator charge pressures. When a pressure reading is below the prescribed minimum, it is restored to the proper level using a high pressure nitrogen cylinder. The cylinders, containing gaseous nitrogen at pressures of over 3,000 p.s.i., are stored in an indoor supply area for safety when not in use, and are taken out onto the ramp only if needed.

Nitrogen cylinders are heavy, weighing upwards of 150 pounds each, and are used in pairs, one being equipped with a pressure reducing regulator for output pressures of from 1,200–3,000 p.s.i., as might be required by hydraulic accumulators, landing gear struts, and the other with a regulator for pressures of from 0–400 p.s.i., the range normally required for aircraft tires. When the pressure in a cylinder falls below 3,000 p.s.i., it is too low for charging struts but more than adequate for servicing tires or operating pneumatic jacks, hence the preference for using them in pairs.

The preferred servicing procedure is to start at the nose gear on one side of the airplane and work back along that side of the fuselage to the main gear struts and tires. After finishing the main gear, the service person crosses under the rear portion of the fuselage, as far forward of the tail as possible, to do the main gear and any other work required on the opposite side. This sequence avoids having to go around the nose end, past the tow tractor and through an area of relatively high activity.

The usual conveyance for cylinders is a conventional welder's cart, which is designed to carry a set of oxygen and acetylene cylinders side by side, between a pair of large diameter, outboard wheels. When the welder's cart is stationary, the cylinders rest on a floor contacting bottom plate in a vertical position. When the cart is to be moved, it is tilted back, so as to lift the bottom plate from the floor and shift the weight of the cart onto the wheels. The welding cart width, across the outboard wheels is usually about 32", which is acceptable for passing through a typical 36" doorway, even if the door is only opened 90°. Welding carts however, are not intended for use on a concrete ramp because the hard steel wheels do not roll freely over expansion joints and other obstacles. Rather, if the steel wheel hits an expansion joint, or any obstacle, it either bounces high enough to clear the obstacle, or slams to a stop so that the cylinders try to tip forward. Once out to the airplane, the height of the nitrogen cylinders creates another potentially serious problem. The cylinders are 60" tall by themselves and, with regulator assemblies installed, are approximately 65" tall. The mechanic can tip the welding cart back to decrease its overall height but, if tipped more than about 20°, the cart becomes quite heavy and hard to manage. Commercial aircraft in general have less than 65" ground clearance under the fuselage or engine pods and the mechanic must be very careful in moving and positioning the cylinders to service tires and struts. The steel wheels of the welding cart can make such careful positioning difficult, increasing the likelihood of denting the aluminum aircraft skin. When a welder's cart is positioned in any given location it is placed in an upright position, with the nitrogen cylinders in a vertical attitude. While this is safe under normal circumstances, the cylinders are only nine inches in diameter and five feet tall, so that stability can not be assured in an otherwise minor accident. The worst case scenario would be letting a cylinder fall or hit something so as to break off a pressure reducing regulator. This would vent pressurized nitrogen to the atmosphere and turn the cylinder into a spinning, bouncing, battering ram. For the foregoing reasons, handling a welding cart on the ramp is considered risky, so that two people are generally assigned to the task as a safety precaution.

The alternative is to block the cylinders in place on a rubber tired, flat bed material handling cart, which is awkward, but doable, and forget about going through 36" wide doors. This would mean using the large roll-up hanger doors at the expense of wasted time and heating/cooling losses. All in all, the ease of loading the cylinders on a welder's cart makes it the least objectionable of the two alternatives.

Therefore, the first object of the present invention is to provide an improved apparatus for handling and conveying pressurized nitrogen cylinders in the proximity of aircraft by minimizing the potential for incidental contact with aircraft. A second object is that this improved apparatus must be easily and safely loaded with pressurized nitrogen cylinders. Another object is to provide protection for the pressure regulator assemblies so as to mitigate the possibility of unintended breakage and a fourth object is to provide this improved apparatus in a form that is readily moved through standard width doors.

SUMMARY OF THE INVENTIONS

The present inventions contemplate improved methods and apparatus for facilitating the handling of nitrogen cylinders as required for pressurizing aircraft tires, oleo struts, hydraulic accumulators and the like. Practice of the present inventions uses some steps and apparatus well known in the aircraft ground servicing arts and therefore, not the subject of detailed discussion herein.

In a preferred embodiment of the present inventions, a three wheeled cart is provided with a rack for holding a pair of side-by-side nitrogen cylinders inclined back at an angle of at least 30° to the vertical. The rack extends to the upper end of the cylinders and is capped with a transverse bumper to retain the cylinders longitudinally. A chain secured to the rack is then passed around the cylinders so as to provide for positive, lockable retention of the cylinders. A single axle, spanning the cart width at the lower end of the cylinders, provides outboard mounting for two rubber tired wheels. A flat plate, fixed at the bottom of the rack and perpendicular to the inclination thereof, is provided for supporting the cylinders on the rack. A swivel mounting at the opposite end carries the single rubber tired front wheel with a hand drawbar pivotally attached to the swivel mount for guiding the front wheel as the cart is pulled. When the drawbar is raised to an upright position, a brake is applied to lock the front wheel. To facilitate loading the cart, it is upended to bring the bottom plate flat against the floor. At the same time, the pivotal drawbar swings down to rest on the floor and stabilize the cart in this position. Thus, one person can transfer vertically standing cylinders from the floor to the rack with relative ease.

BRIEF DESCRIPTION OF THE DRAWINGS

The accompanying drawings are incorporated into and form a part of the specification to assist in explaining the present inventions. The drawings illustrate preferred and alternative examples of how the inventions can be made and used and are not to be construed as limiting the inventions to only those examples illustrated and described. The various advantages and features of the present inventions will be apparent from a consideration of the drawings in which.

DETAILED DESCRIPTION OF THE DRAWINGS

Figure 1:
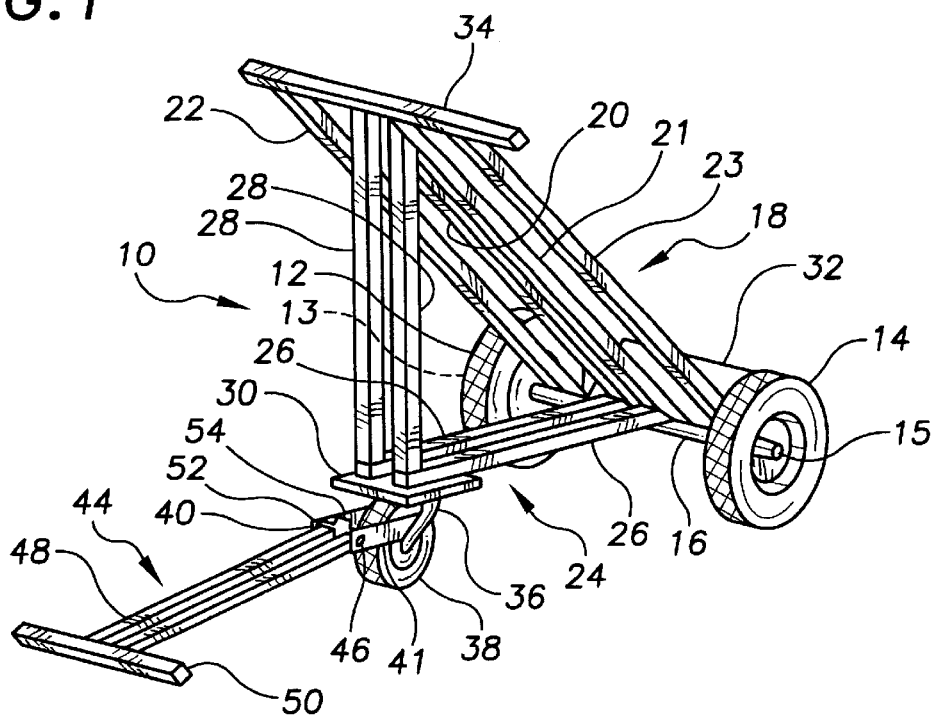
FIG. 1 shows a preferred embodiment of the cart of the present inventions.

The embodiments shown above and described herein are exemplary. Many details are well known in the art, and as such are neither shown nor described. It is not claimed that all of the details, parts, elements, or steps described and shown were invented herein. Even though numerous characteristics and advantages of the present inventions have been described in the drawings and accompanying text, the description is illustrative only, and changes may be made in the detail, especially in matters of shape, size, and arrangement of the parts within the principles of the inventions to the full extent indicated by the broad general meaning of the terms used in the attached claims.

Figure 2:
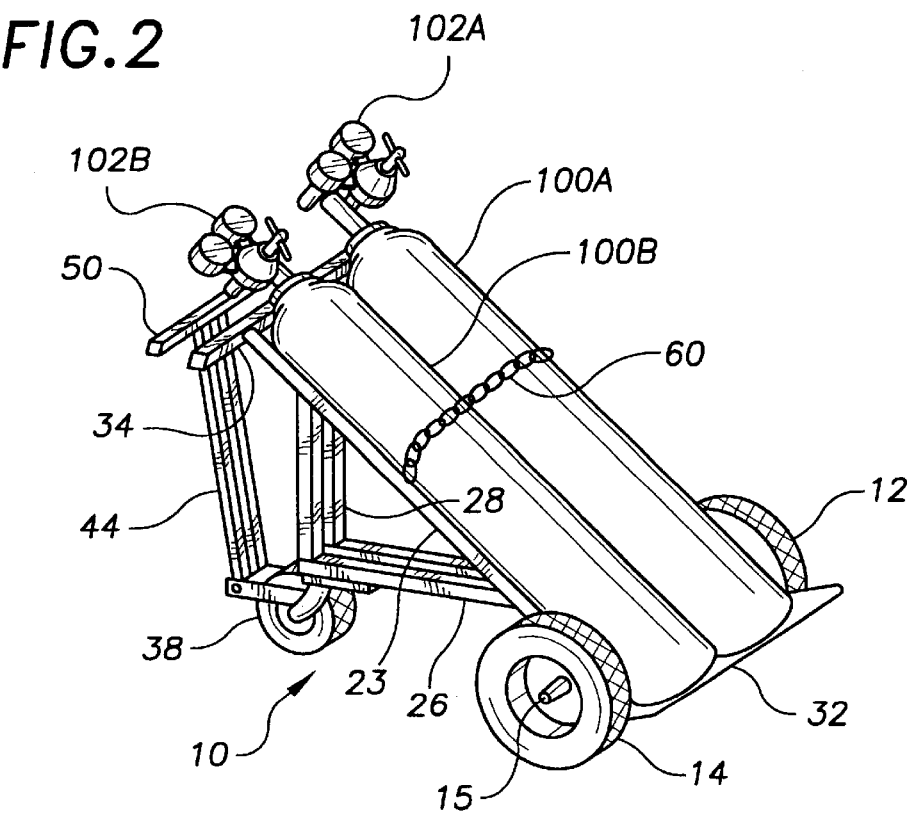
FIG. 2 shows the cart of FIG. 1 as it appears when loaded with gas cylinders.

FIGS. 1 and 2 are illustrative of forms expressing a preferred embodiment of cart 10 of the present inventions. Left and right rubber tired, preferably pneumatic, wheels 12 and 14, with hubs 13 and 15 respectively, are mounted for rotation on spindles at the ends of axle 16. Axle 16 acts as a cross-member of welded base frame structure 24, supporting the lower end of inclined cylinder holding rack 18. Cylinder holding rack 18 comprises left and right inside longitudinal members 20 and 21 respectively, together with right and left outside longitudinal members 22 and 23 respectively. Left longitudinal members 20 and 22 are spaced to cradle a 9" diameter, such as that of nitrogen cylinders 100A and 100B, as are right longitudinal members 21 and 23. In order to provide stable retention of nitrogen cylinders 100A and 100B as cart 10 is moved, cylinder holding rack 18 is inclined at an angle of at least 30° from vertical. This inclination also provides vertical clearance for passing the cart under the aft fuselage of most aircraft. Bottom plate 32, the plane of which is substantially perpendicular to the inclination of cylinder holding rack 18 and substantially tangent to the periphery of wheels 12 and 14, structurally joins to and connects the lower ends of longitudinal rack members 20–23. Bumper bar 34 structurally joins to and connects the upper ends of longitudinal rack members 20–23 and extends outward to protect the regulator assemblies 102A and 102B from accidental damage.

Base frame 24 comprises horizontal members 26, extending forward from axle 16 to a structural connection with wheel support plate 30 and vertical members 28. In turn, vertical members 28 provide structural connection to the upper end of cylinder holding rack 18, proximate bumper bar 34. Wheel swivel rig 36, including pneumatic tired wheel 38, is affixed to the underside of wheel support plate 30 where it provides steering capability for guiding cart 10. Drawbar mounting extensions 40 and 41 are welded to wheel swivel rig 36 and extend beyond the periphery of wheel 38 to provide a pivotal connection for drawbar 44 at pivot pin 46, permitting a wide range of angular movement as will be discussed below. Drawbar 44 comprises connecting hub 52 including braking lug 54, extended tongue 48 and "T" handle 50.

In FIG. 2, drawbar 44 is raised to a substantially vertical position, rotating braking lug 54 into forcible engagement with the periphery of wheel 38 to provide a wheel locking brake. Nitrogen cylinders 100A and 100B are seen to be cradled between the inside and outside longitudinal rack members where they are supported by bottom plate 32 and retained by transverse bumper bar 34 and safety chain 60. The manner in which the extended length of bumper bar 34, and its position, serve to protect pressure reducing regulators 102A and 102B from accidental damage is also shown in this view. Drawbar 44 is raised to a substantially vertical position, locking wheel 38, but is stopped short of going past the vertical where "T" handle 50 might contact pressure regulator 102A or 102B.

Figure 3:
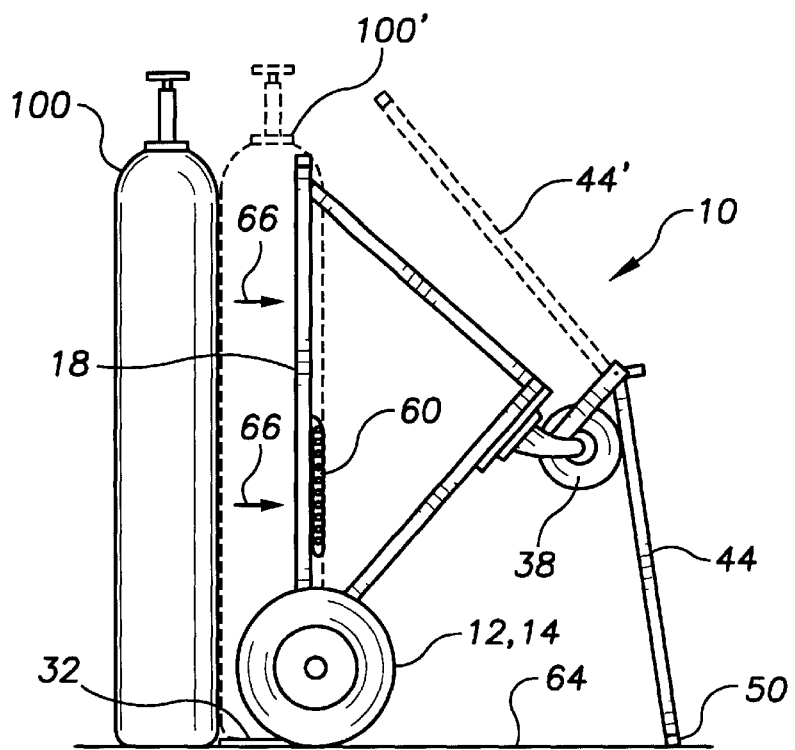
FIG. 3 shows the cart of FIG. 2 as it appears when tipped up for transfer of gas cylinders from or to the floor.

FIG. 3 shows the manner of transferring a standing nitrogen cylinder 100 from the storage area floor 64 to cart 10, when cart 10 is placed in the "loading" position. Here, the significance of the previously described tangent relationship of bottom plate 32 to the periphery of wheels 12 and 14 is clearly illustrated. Cart 10 has been upended so that bottom plate 32 rests on floor surface 64 to support the weight of cart 10, thereby placing rack 18 in a vertical orientation. Wheels 12 and 14 may have incidental contact with floor surface 64 in this position, but are not required to support any portion of the weight of cart 10. Drawbar 44 swings all the way down, more than 180° from the generally vertical position shown in FIG. 2, so that "T" handle 50 also rests on floor surface 64. In this manner, drawbar 44 acts as a brace, stabilizing cart 10 in the loading position, so that one person can transfer a standing nitrogen cylinder from floor surface 64 to rack 18 without needing any help in holding cart 10 in place. Nitrogen cylinder 100 is tipped gently back and rocked from side-to-side to move it onto bottom plate 32 and in the direction of arrows 66 to the loaded position 100'. Once nitrogen cylinder(s) 100 are in place against rack 18, they are secured by passing safety chain 60 around them, as shown in FIG. 2. As soon as nitrogen cylinders 100 rest on bottom plate 32, the bracing provided by drawbar 44 becomes unnecessary. Drawbar 44 can now be pivoted upward to return to the previously shown, wheel locking position 44'. The length of rack 18 and the location of bottom plate 32, with respect to nitrogen cylinder 100, provide a generous mechanical advantage. Thus, cart 10 can readily be pulled back down from its upended loading position to rest on all three of its wheels 12, 14 and 38, with nitrogen cylinders 100 safely in a stable tilted attitude. The transition from one position to the other is made smoothly since the periphery of wheels 12 and 14 is substantially tangent to bottom plate 32.

Figure 4:
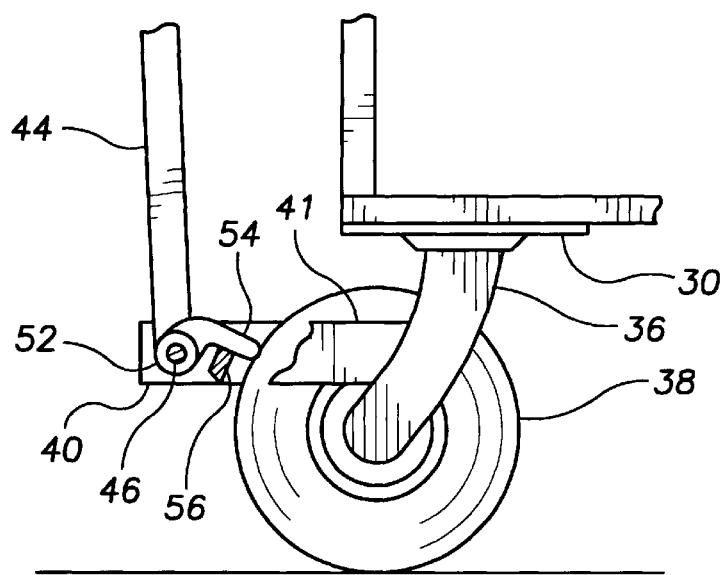
FIG. 4 is an enlarged, detail view of the front wheel and drawbar, showing parking brake lug engagement of the front wheel.

FIG. 4 shows a broken out cross-sectional view of details of the drawbar actuated wheel lock or parking brake. As previously described, drawbar mounting extensions 40 and 41 extend horizontally from wheel swivel rig 36, beyond the periphery of wheel 38. The near side drawbar mounting extension 41 is broken away to show the pivotal connection of drawbar 44 by connecting hub 52 on pivot pin 46. Also seen in this view, wherein drawbar 44 is pivoted up to a substantially vertical position, is the forced engagement of braking lug 54 with wheel 38 prevents rotation thereof to provide a wheel lock or parking prake. Stopping block member 56 is arranged to stop the upward movement of drawbar 44 in the vertical position, which is designed to produce the maximum braking effect.

The restrictive description and drawings of the specific examples above do not point out what an infringement of this patent would be, but are to provide at least one explanation of how to use and make the inventions. The limits of the inventions and the bounds of the patent protection are measured by and defined in the following claims.

I claim:

1. A three wheeled cart for use in loading and carrying a set of two elongate gas cylinders side-by-side in an inclined attitude, comprising:
   a base frame having transverse and longitudinal axes and front and rear ends;
   a rack mounted on said base frame and configured for holding a set of two side-by-side elongate gas cylinders inclined at an angle of up to 60° from said longitudinal axis;
   a transverse bottom plate disposed in a plane perpendicular to said angle of inclination and located to support said elongate cylinders when held in said rack;
   two ground supported non-steerable wheels;
   a transverse axle with one of said wheels mounted at each end thereof, said axle being mounted at the rear of said base frame so that the periphery of each said wheel is substantially tangent to the plane of said bottom plate;
   a ground supported steerable wheel assembly mounted at the front of said base frame; and
   a drawbar pivotally attached to said steerable wheel assembly for pivotal movement in a vertical plane, the drawbar length and pivotal attachment thereof being such that said drawbar contacts the ground when said bottom plate rests on the ground and supports said rack in a vertical position.

2. The three wheeled cart for use in loading and carrying a set of two elongate gas cylinders side-by-side in an inclined attitude according to claim 1 wherein said rack comprises spaced apart longitudinally inclined members.

3. The three wheeled cart for use in loading and carrying a set of two elongate gas cylinders side-by-side in an inclined attitude according to claim 1, wherein said pivotally attached drawbar pivots through a vertical range of at least one-hundred and eighty degrees.

4. The three wheeled cart for use in loading and carrying a set of two elongate gas cylinders side-by-side in an inclined attitude according to claim 1, wherein said said drawbar selectively engages and prevents rotation of said steerable wheel.

5. Apparatus for use in loading and carrying a set of two elongate gas cylinders side-by-side in an inclined attitude for servicing aircraft, comprising:
   a base frame having a front to rear orientation;
   a cylinder holding rack mounted on said base frame and having spaced apart longitudinal members inclined at an angle of at least thirty degrees from the vertical;
   a bottom plate perpendicular to and joining said longitudinal members at the lowermost ends thereof;
   two ground supported non-steerable wheels;
   a transverse axle at the rear of said base frame and having two ends for rotary mounting of said wheels outboard of said cylinder holding rack, said axle being mounted with respect to said longitudinal members so that the peripheries of said wheels are substantially tangent to the plane of said bottom plate;
   a ground supported steerable wheel assembly mounted at the front of said base frame; and
   a drawbar pivotally attached to said steerable wheel assembly for pivotal movement in a vertical plane, the drawbar length and pivotal attachment thereof being such that said drawbar will support said longitudinal members in a vertical position with said bottom plate resting on the ground.

6. Apparatus for use in loading and carrying a set of two elongate gas cylinders side-by-side in an inclined attitude according to claim 5, wherein said pivotally attached drawbar pivots through a vertical range of at least one-hundred and eighty degrees.

7. Apparatus for use in loading and carrying a set of two elongate gas cylinders side-by-side in an inclined attitude according to claim 5, wherein said said drawbar selectively engages and prevents rotation of said steerable wheel.

8. A method for loading a set of two pressurized gas cylinders on an inclined cylinder holding rack of a three wheeled cart with a drawbar comprising the steps of:
   providing a first wheel mounted at one cart end for steering by pivotal movement of the drawbar in a first plane;
   providing a bottom plate for the cylinder holding rack, the plane of the bottom plate being normal to the angle of inclination and at the cart end opposite the drawbar;
   providing an axle located to mount second and third wheels so that the bottom plate is substantially tangent thereto;
   raising the drawbar end of the cart so as to place the plane of the bottom plate against the ground and reorient the cylinder holding rack vertically;
   lowering the drawbar, by pivotal movement in a second plane, to contact the ground as a prop and support the cylinder holding rack in its vertical position;
   transferring cylinders in a standing, vertical position from the ground to the cylinder holding rack in a side-by-side position and securing the cylinders thereon;
   raising the drawbar; and
   lowering the drawbar end of the cart so that all wheels thereof contact the ground.

* * * * *